April 14, 1959

B. G. PRICE ET AL 2,882,488

PIPE INSPECTION APPARATUS

Filed June 1, 1954

Berry Glenn Price
Julian H. Unger
Fenton M. Wood
INVENTORS

BY Thomas O. Arnold

ATTORNEY

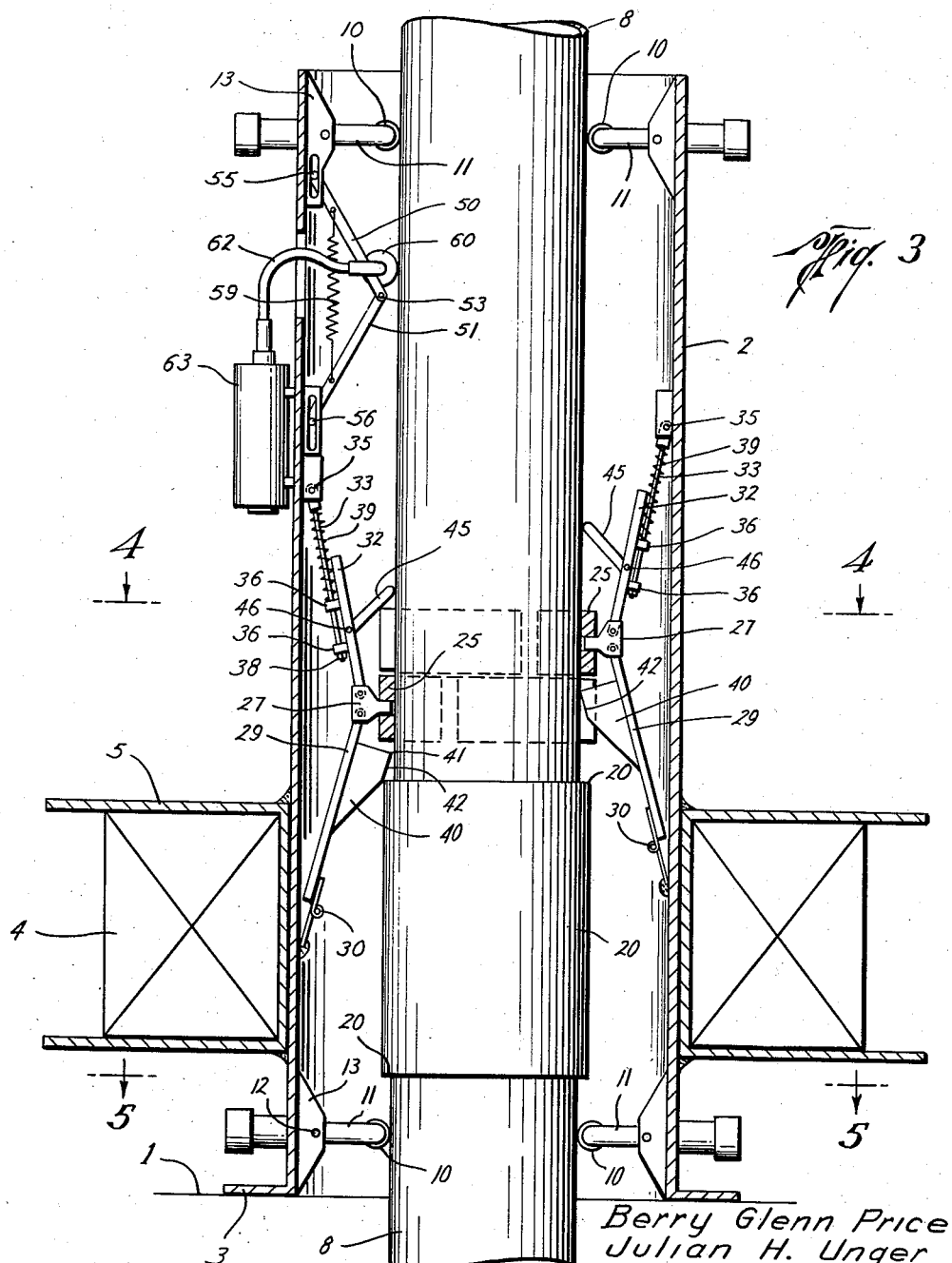

April 14, 1959    B. G. PRICE ET AL    2,882,488
PIPE INSPECTION APPARATUS
Filed June 1, 1954                                                       5 Sheets-Sheet 3
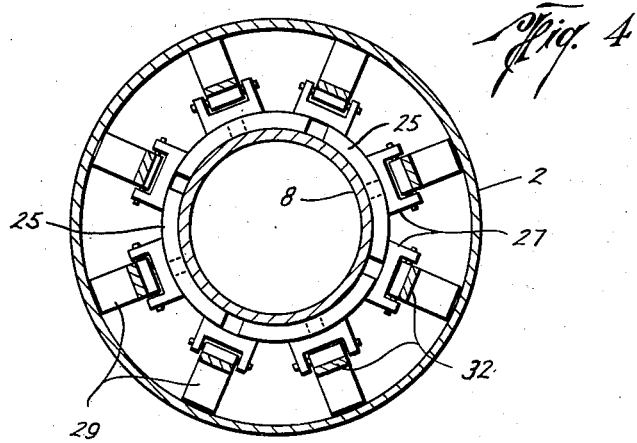
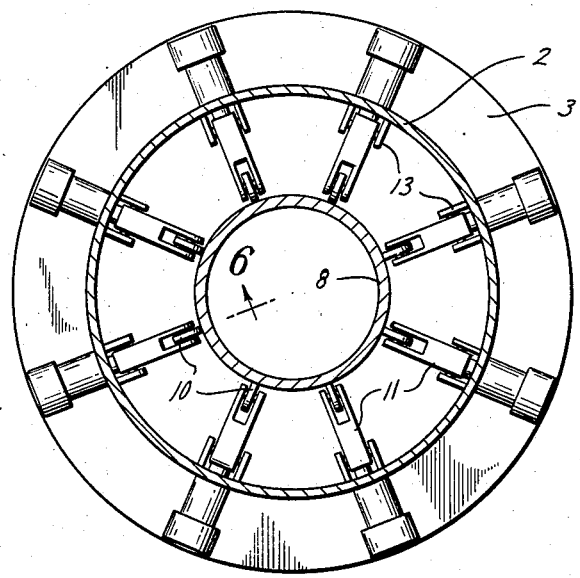
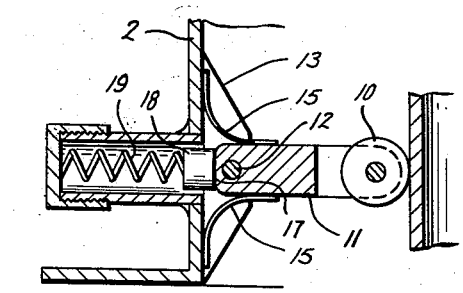
Berry Glenn Price
Julian H. Unger
Fenton M. Wood
          INVENTORS
BY *Thomas O. Arnold*
                    ATTORNEY April 14, 1959    B. G. PRICE ET AL    2,882,488
PIPE INSPECTION APPARATUS
Filed June 1, 1954                      5 Sheets-Sheet 4
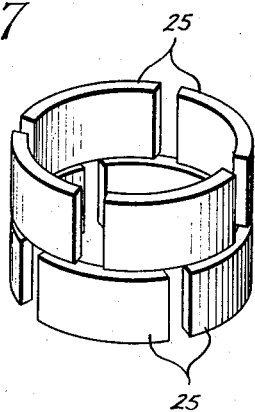
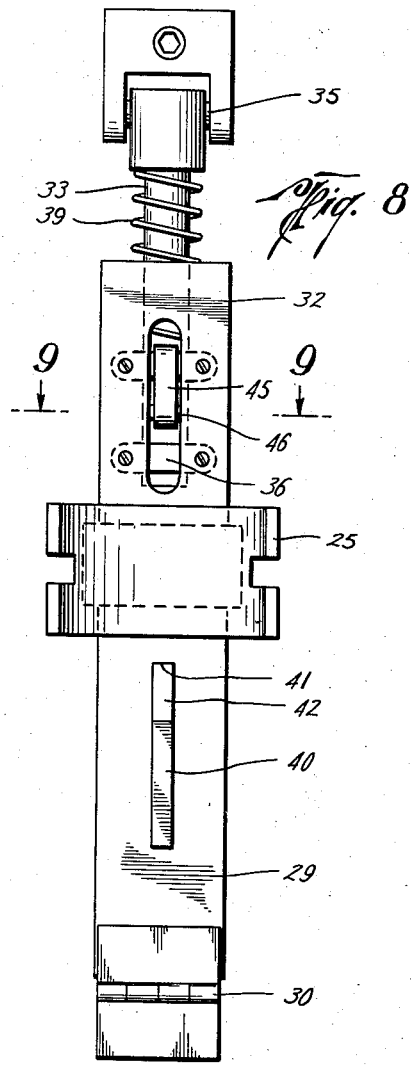
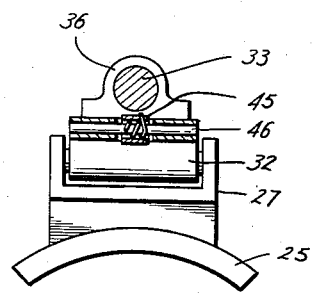
Berry Glenn Price
Julian H. Unger
Fenton M. Wood
            INVENTORS
BY Thomas O. Arnold
                 ATTORNEY April 14, 1959    B. G. PRICE ET AL    2,882,488
PIPE INSPECTION APPARATUS Filed June 1, 1954    5 Sheets-Sheet 5

Berry Glenn Price
Julian H. Unger
Fenton M. Wood
INVENTORS

BY Thomas O. Arnold

ATTORNEY

United States Patent Office 2,882,488
Patented Apr. 14, 1959

2,882,488
PIPE INSPECTION APPARATUS

Berry Glenn Price, Fenton M. Wood, and Julian H. Unger, Houston, Tex., assignors to Tuboscope Company, Harris County, Tex., a corporation of Delaware Application June 1, 1954, Serial No. 433,577

8 Claims. (Cl. 324—37)

This invention relates to means for inductive electromagnetic inspection of pipe, and more particularly to improved apparatus making it possible to inspect pipe on the rig floor as it is lowered into or raised out of an oil well.

Defects in pipe made of magnetic material can be detected by magnetizing the pipe and by passing appropriate coils over the surface of the pipe. Cracks or other defects in the pipe cause disturbances in the magnetic flux at the surface of the pipe, and thereby induce characteristic signals in the coils adjacent the pipe as the defects pass beneath the coils. These signals are then recorded or observed through the use of any one of a variety of indicator means well known in the art and the presence or absence of defects in the pipe is thereby determined.

Heretofore, this means of pipe inspection has not been practical for the inspection of pipe as it is lowered into or raised out of an oil well in the normal course of operations because of the impossibility of positioning the coils on the pipe without impeding the pipe handling and without having the inspection unit damaged when upsets at pipe joints pass therethrough. Also, when a defect passes rapidly under a pickup coil, the flux variation in the coil is rapid thereby inducing a large signal in the coil, whereas when the defect passes slowly under the coil, a small signal is obtained. Since pipe is lowered into and pulled out of wells at varying speeds, it has heretofore been impossible to reliably determine the size and character of a defect by the signal induced in any pickup coil which might be held next to pipe being handled in a well.

An object of this invention, therefore, is to provide improved means for the inductive electromagnetic inspection of pipe while it is being lowered into a well or removed from a well.

Another object of this invention is to provide improved apparatus whereby speed of movement of pipe does not affect the character or size of the signal observed.

Still another object of this invention is to provide improved inspection apparatus including novel means for permitting the upsets at pipe couplings to pass through the apparatus without damage to the apparatus and without being impeded by the apparatus.

A further object of this invention is to provide novel means for mounting the inspection housing so that it may be positioned vertically and moved vertically in a controlled manner with appropriate reference to the pipe movements at the same moments.

A still further object of this invention is to provide improved and novel means for positioning the inspection housing and the pipe in a positive and rigid concentric relationship with each other, while at the same time permitting upsets to pass easily through the housing.

Other objects are apparent from the following description and accompanying drawings wherein:

Figure 3 is a schematic elevational section of a preferred form of the scanning housing portion of the invention with pipe positioned therein.

Figure 4 is a horizontal section taken along line 4—4 of Figure 3 showing in particular, the pickup shoe support means.

Figure 5 is a horizontal section taken along line 5—5 in Figure 3 showing in particular a preferred means for holding the housing substantially concentric with the pipe.

Figure 6 is an elevational section taken along line 6—6 in Figure 5 depicting in detail a preferred means for holding the housing substantially concentric with the pipe.

Figure 7 is a pictorial view depicting the pickup shoes in one preferred position with respect to each other.

Figure 8 is an elevational detail of the pickup shoe support means.

Figure 9 is a detail, partially in section, taken along line 9—9 of Figure 8, showing the spring loading on a finger which is a part of the invention.

Figures 1, 2:
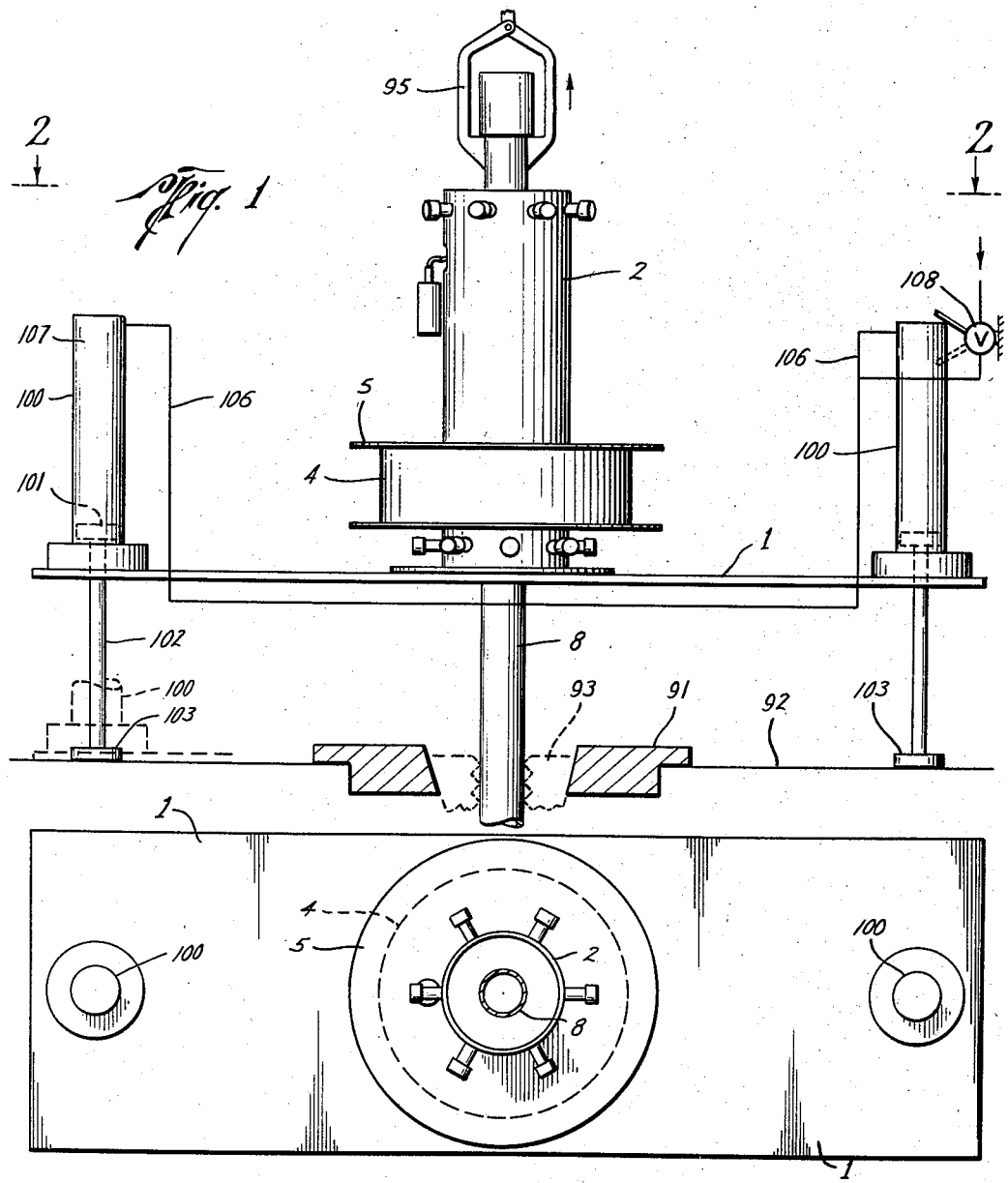
Figure 1 is an elevational view of the entire invention on an oil well rig floor with drill pipe passing therethrough, the invention being near the upper limit of its vertical movement.
Figure 2 is a plan view of the entire invention as illustrated in Figure 1.

The chassis of the preferred form of the invention is best seen in Figure 1 as a small platform 1 to which other assemblies are secured. The pipe scanning or pipe inspection portion of the invention is contained in a cylindrical housing 2. Conveniently, there may be a flange 3 at the lower end of the housing 2 to assist in supporting and securing the housing 2 in a stable manner upon the platform 1. If desired, the flange may be either welded or bolted to the platform 1.

This invention is adapted for inspection of magnetized pipe. Conveniently, the pipe may be magnetized by means of a coil of wire 4 wound on an appropriate spool 5 which is positioned around the housing 2, preferably a short distance above or below the pickup coils hereinafter discussed. A distance of six inches between the magnetizing coil and the closest pickup coil has been found to be satisfactory.

Means are provided for positioning the housing 2 around the pipe 8, preferably in a fairly rigid and substantially concentric relationship with the pipe. It is preferred that such means be provided at each end of the housing 2, as shown in Figure 3. In the embodiment shown, two groups of housing positioning wheels 10 are provided, the wheels of each group being arranged circumferentially around the pipe 8 to be inspected.

The wheels 10 are mounted on short wheel arms or centering arms 11 which are hinged on pins 12 to brackets 13. The brackets 13 are rigidly secured to the housing 2. The centering arms 11 are normally radial from the central axis of both the pipe 8 and the housing 2, and normally perpendicular to the internal surface of the housing 2. The centering arms are so hinged, however, as to permit their pivoting about 90° from the normal position either upward or downward, in a plane which contains the axis of both the housing 2 and the pipe 8. Two springs 15, shown in Figure 6, may be positioned on each side of the centering arms 11 to urge the arms into the normal position.

A non-positive locking means is also preferred to secure the centering arms 11 more or less rigidly in the radial position perpendicular to the axis of the housing, during passage of the pipe 8 through the housing. This relatively rigid positioning is desired because as pipe is being pulled from a hole it tends to lurch from side to side and would cause the housing 2 and the magnetizing coil 4 to whip somewhat. Such motion would make it difficult to keep the pickup shoes seated properly on the pipe and in this and other ways would operate to limit the quality of the inspection record.

Such locking may be accomplished by the structure detailed in Figure 6. The hinge end of the centering arm 11 is provided with a flat surface 17 which, in the embodiment shown, is perpendicular to the axis of the centering arm 11. When the centering arm 11 starts to move out of the radial position, one edge of the flat surface 17 is moved against the plug 18. The force exerted by the coil spring 19 opposes this movement thereby tending to hold the arm in its normal radial position. The strength of the spring 19 determines the degree of positiveness of the locking accomplished.

It is apparent that the flat surface 17 does not have to be perpendicular to the centering arms 11. The mechanism works equally effectively if the surface 17 is at some other angle, so long as the direction of the spring 19 and plug 18 cooperate with the surface 17 to urge the arm 11 in its radial position. Further, a flat surface is not required, so long as an urging force, as from the spring 19, cooperates with some portion of the arm 11 to urge it to the radial position. It is noted that in the preferred embodiment of this mechanism, the single force derived from the spring 19, operates upon one point of the centering arm when it moves one way, and upon another point of the centering arm when it moves another way, in each instance creating a moment urging the centering arm back to its radial position, and there is no urging and no possibility of urging the arm beyond the radial position.

The effect of the arrangement shown is to have two forces acting on lines which pass on either side of the pivot pins 12 of the hinge by which the arms 11 are secured to the housing. The two forces cancel out when the arms 11 are radial, but one or the other acts to create a moment toward the radial position whenever the arms are not radial.

Drill pipe and other pipe which is often run into oil wells frequently has an annular shoulder or upset 20 at the joint of each two lengths of pipe. When such an upset enters the housing, the housing centering means must not jam, but must be fairly easily moved out of the way by the upset. When such an upset engages a wheel 10, the centering arm is moved from its normal position so that the upset 20 may pass. As soon as the upset 20 has passed, the centering arm 11 returns to its normal position in response to the urging of the springs 15, and is semi-rigidly locked there by the coil spring 19 urging the plug 18 against the flat surface 17.

The length of the centering arms 11 is predetermined to accommodate the nominal O.D. plus anticipated variations of the pipe to be inspected. Usually, the actual O.D. of drill pipe is within 1/16 inch of the nominal O.D., and a centering arm length is chosen which will permit 1/16 inch play between the wheels 10 and pipe of accurate nominal O.D.

It will be obvious to those skilled in the art that other means for positioning the housing in substantially concentric relationship with the pipe can be used. For example, three or more long bowed leaf springs may be positioned circumferentially around the housing with the ends of the springs secured to the housing and the bow extending inward into contact with the pipe. The structure previously described is preferred, however, because of its more positive action and freedom from drag on the pipe.

Pickup coils (not shown) are housed in pickup shoes 25 which are shown pictorially in Figure 7, and in elevation in other figures. In accordance with this invention, means are provided for resiliently urging the pickup shoes 25 against the pipe, and for removing such shoes from contact with the pipe when an upset 20 approaches the shoes.

The support member for the pickup shoe may take the form of a bracket 27 which may be mounted on an elbow as described below. Hinged to one side of the bracket 27, there is a shoe support arm 29. The shoe support arm 29 is connected by a hinge 30 to the housing 2. Hinged to the other side of the bracket 27 is a telescoping mechanism which functions as a second shoe support arm. A bar 32 and a rod 33 are positioned in side-by-side relationship. The bar 32 is hingedly connected to the bracket 27, and the rod 33 is connected by a hinge 35 to the housing 2. Secured to one side of the bar 32 there are appropriate brackets 36 through which one end of the rod 33 extends. An appropriate nut or head 38 may be placed on the end of the rod 33 to prevent the brackets 36 from slipping off of the end of the rod 33. This arrangement permits the two members 32 and 33 to reciprocate, one with respect to the other, within a limited range, while their axes remain parallel.

Normally, the rod and bar are near their most extended position, and are urged to that position by some resilient means such as a coil spring 39 surrounding the rod 33 between a bracket 36 and the hinge 35. The action of the spring 39 is to resiliently urge the pickup shoe into sliding contact with the pipe 8, while at the same time permitting the telescoping of the bar 32 and the rod 33 so that the pickup shoe 25 may be removed from contact with the pipe 8.

Means are provided for moving the pickup shoe 25 away from the pipe at any time that a substantial surface irregularity, such as an upset 20, approaches the shoe. Two embodiments of such means are illustrated in Figure 3. There may be a wedge 40 secured to the shoe support arm 29 and extending toward the pipe 8. When the pickup shoe 25 is in position against the surface of the pipe, the inwardmost point 41 of the wedge 40 is immediately adjacent the pipe 8. The innermost edge 42 slants away from the pipe 8 in the direction away from the shoe 25. When an upset 20 approaches the shoe 25, it first engages the wedge 40 and pushes the wedge 40, and thereby the shoe 25, outward so that the upset 20 may pass freely by the shoe 25.

A finger 45 is secured to the bar 32 and extends inward so that the end thereof is normally in contact with the surface of the pipe 8 and at an angle with the pipe on the order of 45°. When an upset 20 approaches the shoe 25 from the side of the shoe on which the finger 45 is located, the finger 45 is engaged by the upset 20. A moment is created about the hinge 35 and the bar 32, carrying with it the shoe 25, is rotated out of the path of the upset 20.

Conveniently, the finger 45 may be secured to the bar 32 by means of a spring loaded hinge 46 such as is detailed in Figure 9. The finger 45 is normally urged toward the pipe so that it will remain in contact therewith. The spring loaded hinge 46 permits the finger 45 to rotate downward through an arc of roughly 90° to permit an upset 20 to pass downward. The pickup shoe 25 is moved out of the way of the upset 20 as the finger 45 rotates. In the embodiment illustrated, the finger 45, in its lowermost position angling downward, assumes a position against the edge of the shoe 25 and extending slightly further inward than the shoe 25 when an upset is passing thereunder.

It should be noted that the various pickup shoes in each circumferential group are spaced slightly apart as illustrated in Figure 4, so that the finger 45 for each of the shoes in the lower bank may operate between two shoes in the upper bank, and so that the wedge type finger 40 for each shoe in the upper bank may operate between two shoes in the lower bank.

The wedge 40 and the finger 45 constitute two forms of guard members for the protection of the pickup shoes. Other means for removing the shoe 25 from contact with the pipe 8 when an upset approaches will be apparent to those skilled in the art. For example, a pickup shoe might be mounted in place of the wheel 10 in a mechanism similar to that detailed in Figure 6. Or it might be mounted on a mechanism similar to that hereinafter described with respect to the speed compensator drive wheel. Conveniently, the hinge 30 may be a slotted type hinge permitting the shoe support arm 29 to reciprocate axially of the housing to a limited extent, thus providing the same character of reciprocal movement of the lower shoe support arm 29 that is afforded to the bar 32 by virtue of the telescoping mechanism in the upper shoe support arm 32—33. When a slot type hinge is used, spring means are normally provided to resiliently urge the shoe support arm 29 towards the upper end of the slot, as described hereinafter in connection with the mounting for the speed compensator drive wheel.

In inductive electromagnetic inspection of the type herein described, the speed of the movement of the pipe beneath the pickup coils affects the strength of the signals induced in the coils. When pipe is being inspected as it is lowered into the well, or removed from the well, it necessarily moves at varying speeds. In accordance with this invention, therefore, means are provided for varying the signal induced in the pickup coils in response to the speed of the movement of the pipe beneath the pickup coils so that the signal strength of the output of the instrument does not vary appreciably with speed of pipe. These circuits are preferably such that the gain or attenuation is a smooth straight line function of speed, because variations in strength of signals induced in the pickup coils are a straight line function of speed.

The mechanical parts of one embodiment of the speed compensation means are illustrated in Figure 3. An elbow, somewhat like that used to mount the pickup shoes, is formed by two arms 50 and 51 which are connected together by a hinge 53. The ends of the elbow 50—51 are each secured to the housing 2 by means of slot hinges 55 and 56 which permit limited reciprocal motion of the elbow arms 50 and 51 in a direction axial of the housing as well as rotative motion. A tension coil spring 59 or similar means may be used to resiliently urge the elbow into bent position so that the hinge 53 is urged outward from the housing 2 toward the pipe 8. If an outward radial force is exerted on any part of the elbow 50—51, the elbow ends slide further away from each other in the slot hinges 55 and 56, the elbow straightens out and the hinge 53 is moved away from the pipe 8.

At or near the hinge 53, a wheel 60, preferably with a knurled or other high friction surface, is secured. The operation of the elbow 50—51 and the spring 59 is such as to urge the wheel 60 into rolling contact with the pipe 8. Preferably, the wheel 60 has a radius somewhat larger than the height of any upset likely to be encountered. Whenever an upset 20 engages the wheel 60, the elbow 50—51 straightens out somewhat, permitting the wheel 60 to roll over the upset 20.

As heretofore mentioned, this elbow structure with the slot hinges may be used to mount the pickup shoes if desired, instead of the type of elbow structure described previously for mounting the pickup shoes. When this is done, the elbow is fitted with guard members of the same type and function as the fingers 40 and 45 heretofore described. When upsets are of modest size, small skis may be secured to the pickup shoes parallel to the pipe and with the ski ends bent away from the pipe so as to guide the shoes over upsets.

Appropriate gearing and shaft or cable means 62 convey the rotative motion of the wheel 60 to other parts of the speed compensation means in a compensator housing 63.

Figure 10:
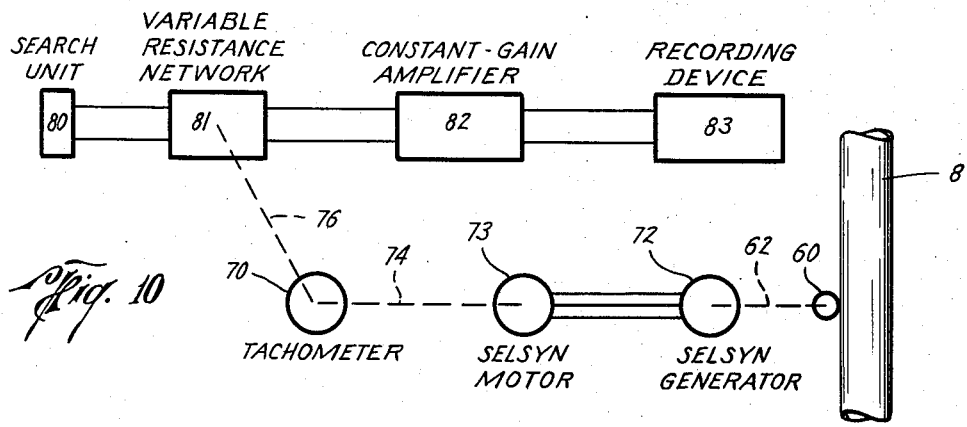
Figures 10, 11 and 12, are different embodiments of speed compensation circuit means which are used in the invention.
Figure 11:
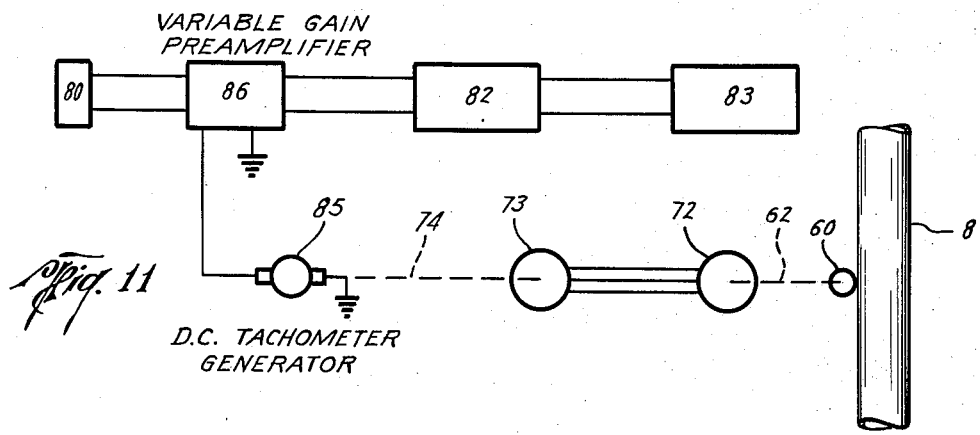
Figure 12:
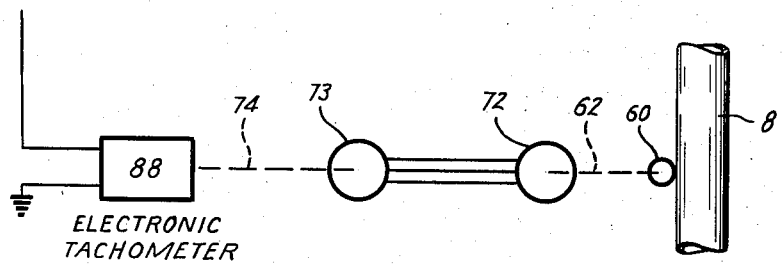

The electrical parts of the speed compensator are shown in schematic and block diagram form in Figures 10, 11 and 12. Consider first the embodiment shown in Figure 10. The speed compensating wheel 60 is shown in contact with the pipe 8. A tachometer 70 is set up to be responsive to the speed of the wheel 60. This may be accomplished by a selsyn generator 72 driven by the cable or shaft 62, a selsyn motor 73 driven by the output of the selsyn generator 72 and providing the power through a selsyn motor shaft 74 to drive the tachometer 70. The tachometer 70 has a mechanical output through a shaft 76 which oscillates, moving in one direction with increased pipe speed and in the other direction with decreased pipe speed. Alternatively, of course, the shaft 62 may drive the tachometer 70 directly, without the use of selsyn units.

A scanning or search unit comprising a pickup coil or a connected group of pickup coils is indicated in Figure 10 by a block 80. The signal derived from the search unit or coils 80 is conveyed through a variable resistance network 81 and a constant gain amplifier 82 to a recording device 83. The resistance of the network 81, and hence the attenuation of the signal derived from the coils 80, is responsive to the rotation of the tachometer shaft 76.

Alternatively, the circuit indicated in Figure 11 may be used. Again the search unit or pickup coil 80, the constant gain amplifier 82 and the recording device 83 are used. Also, the wheel 60, shaft or cable 62, selsyn generator 72, selsyn motor 73 and selsyn motor shaft 74 are provided. In this instance, however, the selsyn motor shaft 74 drives a D.C. tachometer generator 85 which is adapted to provide a D.C. signal, variable in response to speed of the pipe 8, which in turn controls an electronically variable gain preamplifier 86 which is positioned between the coil 80 and the constant gain amplifier 82.

In a third alternative illustrated in Figure 12, an electronic tachometer 88 is substituted for the D.C. tachometer generator of Figure 10, and the variable gain preamplifier 86 is controlled by the output of the electronic tachometer 88. Well known forms of electronic tachometers include mechanisms for operating a switch a predetermined number of times with each revolution of the shaft 74, in combination with a circuit which produces a D.C. voltage in response to the frequency of such switch operations.

By the circuits above indicated, most speed variations can be adequately compensated for. Conveniently, certain mechanical structure and mechanism may also be used to assist in solving the speed variation problem.

When pipe 8 is to be lowered into or removed from a well, it is moved through an opening in a rotary table 91 normally positioned in the rig floor 92. When pipe is being removed from the well, a stand of three or four joints of pipe is pulled upward until a joint between two lengths of pipe is two feet or so above the rig floor 92. Slips 93 are then set in the rotary table 91 around the pipe to secure it, and the connection just above the rig floor is broken. Thereupon, the stand of pipe is racked at the side of the rig, and elevators 95 are secured to the pipe still in the hole just below the upper upset. The slips 93 are released or removed and the pipe is lifted upward until a second stand of pipe is above the rig floor 92.

In accordance with this invention, means are provided for moving the inspection unit at the beginning and end of the pipe movement so as to permit a slight overlapping of the pipe scanned during each pipe movement, so as to provide an almost instantaneous acceleration of relative movement between the pipe and inspection unit, and so as to facilitate the placement and removal of slips.

On both ends of the platform 1, there is secured a cylinder 100 in a vertical position. Within each cylinder 100, a piston 101 is positioned.

To each piston 101, there is secured a piston rod 102 extending below the platform 1. Conveniently, there may be a foot 103 at the lower end of each piston rod 102, adapted to sit upon the rig floor. The piston rods 102 are preferably about as long as the cylinders 100. Both are preferably on the order of a foot and a half or two feet long.

A pressure line 106 connects the two chambers 107 defined by the top of each of the two cylinders 100 and the two pistons 101. The pressure line 106 is also connected to a valve 108. The valve 108 is connected to a source of fluid under pressure, preferably compressed air. The valve 108 is also equipped to bleed air or other fluid from the line 106 when desired.

In the following discussion of the operation of this invention, let it be assumed that the total height of the particular model of this invention being used is twenty inches when the unit is sitting on the rig floor. That is, the top of the housing 2 is twenty inches above the rig floor. Further, assume that the elevators 95 have been secured to pipe 8, and that the lower end of the elevators occupy a position some two to ten inches above the top of the housing 2, just prior to the commencement of the lifting of the pipe.

Air under moderate pressure is admitted through the valve 108 and the line 106 to the two cylinder chambers 107, thereby causing the platform 1 and the entire inspection unit to rise upward until the housing 2 engages the elevators 95. Conveniently, a damage plate (not shown) may be secured to the top of the housing 2 to absorb the punishment of this contact. At this time, the elevators 95 are pulled upward, accelerating slowly at first. The inspection unit follows the elevators upward for a foot or so, so that there is, at first, no relative movement between the pipe and the inspection unit housing 2. The slips 93 are removed when the platform 1 has sufficiently cleared the rig floor 92, to permit such removal.

When the pistons 101 have reached the full limit of their stroke, the upward movement of the inspection unit suddenly ceases, and the speed of relative motion between the pipe and the inspection unit immediately jumps to the speed of upward movement of the pipe. Since the pipe is accelerated during its first foot or so of upward movement to a substantial speed, perhaps approaching its normal speed of upward movement, the inspection commences, for all practical purposes, at a speed near the normal speed.

Pipe is inspected during the lifting of a stand of pipe. When a stand of pipe has been raised above the rig floor, the lifting is terminated and the pipe is stopped with a joint between two lengths either within or near the housing 2. Slips 93 are placed around the pipe in the rotary table 91. After the slips are positioned, air is bled from the cylinder chambers 107 through the valve 108, and the inspection unit drops downward to the rig floor, inspecting pipe as it drops downward.

When the inspection unit drops to the rig floor, it leaves the joint several inches above the housing 2. The joint may then be broken and the stand of pipe removed. The elevators 95 are then again secured to the pipe just above the housing and the next stand of pipe is inspected as it is pulled from the well.

It is apparent that other means may be used for lifting the housing from the floor and into contact with the elevators 95, and for causing the housing 2 to follow the elevators upward for a short distance. For example, each of the cylinders 100 might have a coil positioned therearound, and the piston means 101 might contain permanent magnets which would be urged downward when the coil surrounding the cylinders 100 are energized. By appropriate energizing or de-energizing of the coils surrounding the cylinders 100, the movement of the housing could be controlled in the same manner as has been above described in connection with the air pressure operation.

The embodiment of the invention herein particularly described is primarily adapted for use on the rig floor. If desired, the housing can be secured, either permanently or temporarily, to the conductor pipe in the cellar beneath the rig floor, and drill pipe may be inspected as it passes through the cellar, without the need for the platform 1, the cylinders 100 and related appurtenances. When so used, the use of speed compensation circuits such as those appearing in Figures 10, 11 and 12, becomes of greater importance, because a foot or two of the pipe out of each stand is inspected at very low speeds during the acceleration of the pipe.

It is apparent that many modifications may be made in the invention as particularly described herein without departure from the scope of the invention. Accordingly, this description should be construed as illustrative only, and not as any limitation upon the invention as defined in the following claims.

We claim:

1. In apparatus for the electromagnetic detection of flaws in magnetized pipe and the like, the combination comprising a cylindrical housing adapted to have pipe passed therethrough; at least one group of housing positioning means positioned circumferentially around said housing, each such positioning means including an arm, a hinge securing each arm near one end thereof to the inside of said housing, first resilient urging means for constantly urging such arms into a position substantially perpendicular with the axis of said housing, each of said arms having a flat surface substantially perpendicular to the axis of said arm, a second resilient means acting on each such flat surface and urging it to assume a position parallel to the axis of the housing; a plurality of two-armed elbows mounted on the inside of said housing and adapted to flex from a relatively straight position to a relatively bent position and resiliently urged toward the relatively bent position; means responsive to irregularities protruding from the surface of pipe being passed through said housing for moving said elbows from the relatively bent position to the relatively straight position until such irregularities have passed; a pickup shoe mounted on each elbow near the bend in such elbow and adapted to be urged into contact with said pipe when said elbow is in the relatively bent position and to be removed from contact with said pipe when said elbow is in the relatively straight position; at least one pickup coil mounted in each pickup shoe and adapted to have signals induced therein when defects in said magnetized pipe pass thereby; a tachometer adapted to be driven in response to the speed of movement of said pipe with respect to said pickup coils; means responsive to said tachometer for modifying the amplitude of the signals derived from said coils; means for indicating the amplitude of said signals as so modified; at least two cylinders secured to said housing with axes substantially parallel to the axis of said housing; a piston means positioned within each of said cylinders and adapted to move therein; an extension from said piston means adapted to protrude from said cylinders and to contact some stationary object, and means for moving said piston means with respect to said cylinders.

2. In apparatus for the inspection of pipe and the like the combination comprising a housing adapted to have pipe passed therethrough; at least one group of housing positioning means positioned circumferentially around said housing, each such positioning means including an arm hingedly secured near one end thereof to the inside of said housing and resilient urging means for urging such arms into a position substantially perpendicular with the axis of said housing; pickup shoes mounted internally of said housing and resiliently urged into contact with the surface of said pipe; pickup coils mounted in said pickup shoes and adapted to have signals induced therein when defects in said magnetized pipe pass beneath said shoes; means responsive to the speed of said pipe for varying the amplitude of the signals induced in said coils in proportion to the speed of relative movement between said pipe and said housing; means for urging said housing in an upward direction and for moving the housing upward for a predetermined distance at selected times and for permitting said housing to move back downward at selected times.

3. In apparatus for the electromagnetic detection of flaws in magnetized pipe and the like, housing adapted to have said pipe passed therethrough; pickup shoes mounted internally of said housing and resiliently urged into contact with the surface of said pipe; pickup coils mounted in said pickup shoes and adapted to have signals induced therein when defects in said magnetized pipe pass beneath said shoes; a plurality of centering arms hingedly secured to the internal surface of said housing in two groups, the individual centering of each group being positioned circumferentially around said housing; said centering arms being normally positioned so as to extend radially inward from said housing and being free to pivot either direction in a plane parallel to the axis of said housing; first resilient urging means normally urging said centering arms into said radial position; said centering arms having a flat surface on the hinged ends thereof which surface is substantially at a right angle with the axis of said centering arm; second resilient urging means normally abutting said flat surface and normally urging said flat surface in a direction radial of said housing.

4. In apparatus for the electromagnetic detection of flaws in magnetized pipe and the like, the combination comprising a housing adapted to have said pipe passed therethrough; means for holding said housing in substantially concentric relationship with said pipe; pickup shoes mounted on the internal surface of said housing and resiliently urged radially inward from said housing; means responsive to externally protruding irregularities in the surface of said pipe for moving said shoes away from the surface of said pipe whenever such externally protruding irregularities approach said shoes; pickup coils mounted in said pickup shoes and adapted to have signals induced therein when defects in said magnetized pipe pass beneath said shoes; at least two cylinders with one closed end, said cylinders being secured to said housing with the cylinder axes substantially parallel to the axis of said housing; a piston in each of said two cylinders adapted to reciprocate therein; a piston rod secured to each of said pistons and adapted to engage a stationary object; means for admitting fluid pressures to and releasing fluid pressures from the chamber defined by the closed end of said cylinder and said piston, whereby said pistons are actuated to move with respect to said cylinders and thereby move said housing with respect to said stationary object.

5. In apparatus for the electromagnetic detection of flaws in magnetized pipe and the like, the combination comprising a housing adapted to have said pipe passed therethrough; a plurality of positioning devices in groups of at least three positioning devices each, the devices in each group being positioned circumferentially around said housing, each positioning device comprising an arm hingedly secured at the first end thereof to said housing and resilient means for urging said arm toward an angle substantially perpendicular to the surface of said pipe, whereby said positioning devices at their normally perpendicular angle offer substantially rigid resistance to forces tending to move said housing with respect to said pipe from a position determined by said positioning devices, while permitting protrusions from the surface of said pipe to move said arms away from the normal angle perpendicular to the surface of said pipe to an angle with respect to the surface of said pipe substantially less than 90°, in which position there is a resilient force tending to position said pipe; pickup shoes mounted internally of said housing and resiliently urged into contact with the surface of said pipe; means responsive to protrusions from the surface of said pipe for moving said shoes away from the surface of said pipe whenever such protrusions approach said shoes; pickup coils mounted in said pickup shoes and adapted to have signals induced therein when defects in said magnetized pipe pass beneath said shoes.

6. In apparatus for the inspection of magnetized pipe and the like, the combination comprising a housing adapted to have said pipe passed therethrough; two groups of centering arms hingedly secured to said housing and normally extending inward toward the axis of said pipe, said arms resiliently urged into a position perpendicular to said pipe, whereby they rigidly hold said housing in concentric relationship with said pipe while permitting passage of irregularities protruding from said pipe; a plurality of two-armed elbows mounted on the inside of said housing and adapted to flex from a relatively straight position to a relatively bent position, said elbows being resiliently urged toward said relatively bent position; a pickup shoe mounted on each elbow and urged thereby into contact with said pipe; at least one pickup coil mounted in each pickup shoe and adapted to have signals induced therein when defects in said magnetized pipe pass thereby; means responsive to the speed of said pipe for varying the amplitude of the signals induced in said coils in proportion to the speed of said pipe.

7. In apparatus for the electromagnetic detection of flaws in magnetized pipe and the like including a fixed body and means for producing axial movement of said pipe past said fixed body from an initial position at rest through a period of acceleration to at least a given minimum velocity, said given minimum velocity being reached by the time a point on said magnetized pipe has moved a predetermined distance, the combination comprising a housing adapted to have a magnetized pipe passed axially therethrough, at least one pickup coil mounted said housing and adapted to have usable signals induced therein when defects in said magnetized pipe pass beneath said pickup coil at at least said given minimum velocity, mounting means supporting said housing on said fixed body for limited movement between a retracted position and an extended position spaced therefrom in the direction of movement of said magnetized pipe by at least said predetermined distance, and means urging said housing toward said extended position.

8. In apparatus for the electromagnetic detection of flaws in magnetized pipe and the like including a fixed body and means for producing axial movement at said pipe past said fixed body from an initial position at rest through a period of acceleration to at least a given minimum velocity, said given minimum velocity being reached by the time a point on said magnetized pipe has moved a predetermined distance, the combination comprising a housing adapted to have a magnetized pipe passed axially therethrough, at least one pickup coil mounted in said housing and adapted to have usable signals induced therein when defects in said magnetized pipe pass beneath said pickup coil at at least said given minimum velocity, mounting means supporting said housing on said fixed body for limited movement between a retracted position and an extended position spaced therefrom in the direction of movement of said magnetized pipe by at least said predetermined distance, means urging said housing toward said extended position, and means movable with said magnetized pipe engaging said housing while said magnetized pipe is in said initial position at rest to hold said housing against movement toward said extended position.

References Cited in the file of this patent
UNITED STATES PATENTS

| 1,052,268 | Nickolson | Feb. 4, 1913 |
| 1,091,615 | Angell | Mar. 31, 1914 |
| 1,097,128 | Hume | May 19, 1914 |
| 1,240,521 | Wendland | Sept. 18, 1917 |
| 1,933,547 | Drake et al. | Nov. 7, 1933 |
| 2,135,675 | Palmer | Nov. 8, 1938 |
| 2,337,148 | Barnes | Dec. 21, 1943 |
| 2,395,730 | Farkas | Feb. 26, 1946 |
| 2,435,985 | Stewart et al. | Feb. 17, 1948 |
| 2,540,870 | Farmer | Feb. 6, 1951 |
| 2,685,672 | Price et al. | Aug. 3, 1954 |
| 2,719,953 | Waldie | Oct. 4, 1955 |